Figure 1A:
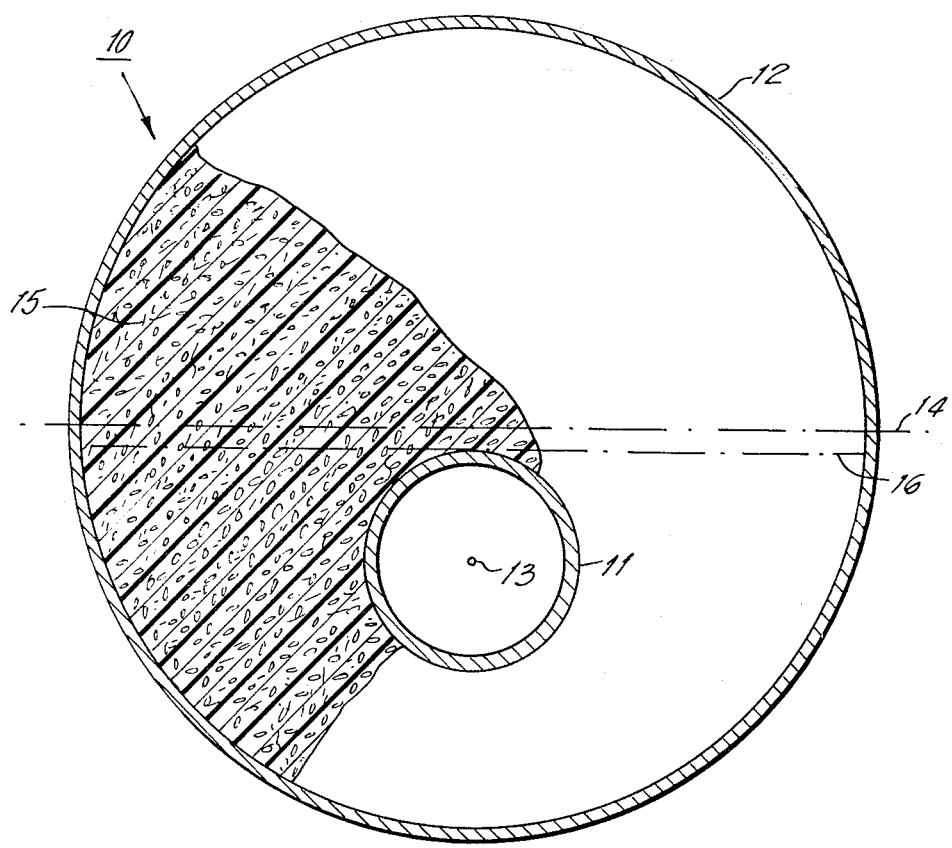

United States Patent

Reighter

[15] 3,684,816

[45] Aug. 15, 1972

[54] COOLING SYSTEM FOR FOAM INSULATED BUS

[72] Inventor: David H. Reighter, Roslyn, Pa.

[73] Assignee: I-T-E Imperial Corporation, Philadelphia, Pa.

[22] Filed: June 15, 1971

[21] Appl. No.: 153,167

[52] U.S. Cl. ............... 174/15 C, 165/105, 174/16 B, 174/28, 174/110 F, 174/110 FC
[51] Int. Cl. ............................................ H01b 7/34
[58] Field of Search........174/16 B, 15 R, 15 C, 99 B, 174/28, 29, 110 F, 110 FC; 165/105

[56] References Cited

UNITED STATES PATENTS

| | | | |
|---|---|---|---|
| 3,609,206 | 9/1971 | McConnell | 174/110 F |
| 3,576,939 | 5/1971 | Ziemek | 174/110 F X |

*Primary Examiner*—Lewis H. Myers
*Assistant Examiner*—A. T. Grimley
*Attorney*—Sidney G. Faber et al.

[57] ABSTRACT

In isolated phase bus systems comprising spaced substantially parallel aligned inner and outer tubular conductors, the interior space thereof being filled with a dielectric foam insulation made up of a predetermined percentage of open cells to enable free migration of vapors. A liquid dielectric having an appropriately selected and relatively low boiling point is inserted into the bus until it reaches a level whereby it substantially covers the inner conductor which is supported by the foam insulation. Conduction of current raises the bus temperature. If the magnitude of the current is such as to raise the temperature above a predetermined level, the liquid dielectric boils and vaporizes. The vaporized dielectric tends to move to a cooler zone within the structure and become condensed whereby the liquid dielectric continuously recirculates through the system to prevent the bus from exceeding a predetermined operating temperature. The controlled amount of the open cells provided in the foam and the positioning of the inner conductor below the longitudinal axis of the outer conductor substantially reduces the amount of liquid dielectric required with no reduction in dielectric withstand.

The liquid dielectric may for example be taken from the group comprised of freons, ucons, or other liquids having predetermined relatively low boiling points and having the characteristics that they are non-reactive with the dielectric foam insulation.

8 Claims, 2 Drawing Figures

PATENTED AUG 15 1972 3,684,816

INVENTOR.
DAVID H. REIGHTER

BY
Ostrolenk, Faber, Gerb & Soffen
ATTORNEYS

COOLING SYSTEM FOR FOAM INSULATED BUS

The present invention relates to isolated phase bus systems and more particularly to an isolated phase bus system having a foam insulation containing a predetermined number of open cells which permit the circulation of a liquid dielectric of relatively low boiling point which is enabled to percolate through the dielectric foam matrix and to convert from liquid to vapor and ultimately back to liquid in a recirculating fashion so as to maintain the bus at a predetermined safe temperature level.

Isolated phase bus systems are well known in the power transmission and distribution fields. Such systems, whether they be employed for single phase or multi-phase use, are typically comprised of an inner tubular conductor, maintained at a high voltage level, surrounded by an outer tubular conductive housing normally maintained at or near ground potential. The spacing between inner and outer conductors is maintained by insulating spacers typically arranged at spaced intervals along the bus run. Since bus of this type is adapted for use at very high current and voltage ratings (the voltage ratings may be typically within the range from 300–1,500 Kv), the electrical stress within the bus is extremely high (of the order of 85 volts per mil and above). In order to maintain the dielectric integrity of the bus, it is typically filled with a gas having a very high dielectric characteristic, such as, for example, sulfurhexafluoride ($SF_6$).

New techniques, however, have been developed to provide support and positioning of the inner and outer conductors relative to one another as well as providing the necessary dielectric strength therebetween. For example, see pending applications (C-1484 and C-1485) Ser. Nos. 31,639 and 31,788, both filed Apr. 24, 1970 and assigned to the assignee of the present invention, which describe foam insulators for use as the insulating spacers or alternatively for use in filling the entire region of the bus defined by the inner and outer conductors, which foam insulators employ $SF_6$ as the foaming agent. Whereas foam insulation is recognized as having satisfactory dielectric characteristics, it is also intrinsically a high thermal insulator. This characteristic makes the foam insulation disadvantageous for use in isolated phase bus systems which carry large amounts of power, since conductor size and power ratings are limited by the maximum operating temperatures which can be tolerated.

The present invention is characterized by providing an isolated phase bus system employing dielectric foam insulation having a predetermined (small) quantity of open cells. The foam insulation fills the interior space defined by the inner and outer conductors. A volatile coolant is inserted into the aforesaid interior region and the particular coolant selected is chosen due to its characteristic of being capable of boiling and vaporizing when the bus temperature reaches a predetermined level. The heat absorbed by vaporization of the dielectric liquid in contact with the hot surfaces of the conductors causes the vapors to travel through the open cells of the foam insulation to locales of lower temperature where the vapors may condense and recirculate. The heat absorbed by vaporization of the liquid in contact with the hot surfaces tends to improve heat transfer coefficients by a factor of 10 or more over those capable of being obtained with conventional convection systems. The volatile coolants are selected from those liquids having excellent dielectric characteristics and boiling points which are selected to control and maintain the maximum temperature in the bus contingent on its ultimate heat removal capabilities. The following coolants, among others, have been found to be capable of providing the necessary characteristics: chlorofluoro-carbon dielectric coolants such as freons or ucons and chlorinated hydrocarbons as well as other volatile liquids which exhibit the above mentioned characteristics and which are also inert to the foam matrix through which the liquid dielectric percolates so as to prohibit deterioration of the foam matrix. By positioning the inner conductor below the longitudinal axis of the surrounding conductive housings and by controlling the amount of open cells provided in the dielectric foam insulation, the amount of liquid dielectric inserted into the bus is substantially reduced while at the same time totally immersing the inner conductor within the dielectric liquid. In addition, the dielectric stress level is reduced as a result of the excellent insulation properties of the coolants.

It is therefore one object of the present invention to provide a novel isolated phase bus system containing foam insulation having a predetermined number of open cells which enables percolation of a liquid dielectric of low boiling point therethrough.

Another object of the present invention is to provide a novel isolated phase bus system containing foam insulation having a predetermined number of open cells adapted to enable percolation of a liquid dielectric of low boiling point therethrough, and wherein the inner conductor is displaced from and positioned below the longitudinal axis of the surrounding conductive housings so as to reduce the amount of dielectric coolant required while at the same time being assured that the inner conductor is immersed within the coolant.

Still another object of the present invention is to provide an isolated phase bus system containing a dielectric foam insulation which fills the interior regions defined by the inner and outer conductors wherein the amount of open cells provided in the foam insulation is of reduced amount so as to significantly reduce the amount of dielectric liquid coolant inserted into the bus.

Figure 1B:
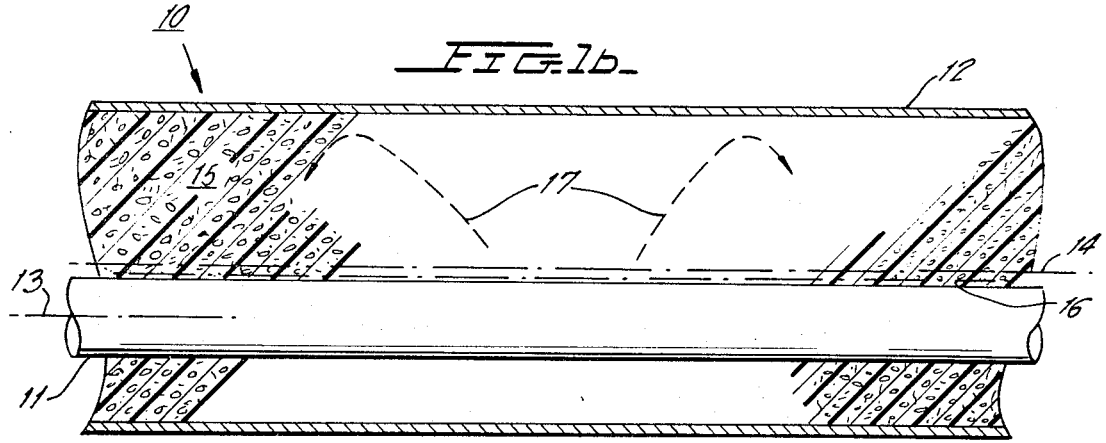

These as well as other objects of the present invention will become apparent when reading the accompanying description and drawings in which:

FIGS. 1a and 1b are sectional side and end views of an isolated phase bus incorporating the principles of the present invention.

Referring now to the drawing, an isolated phase bus system 10 is shown therein as being comprised of an elongated hollow tubular inner conductor 11 positioned within and surrounded by an elongated hollow tubular conductive housing 12 whereby the longitudinal axis 13 of the inner conductor 11 is displaced from and substantially parallel to the longitudinal axis 14 of conductive housing 12.

The hollow interior region of substantially annular shape, which is defined by the exterior surface of inner conductor 11 and the interior surface of conductive housing 12 is filled with a dielectric foam insulation 15 which is preferably formed of an insulation material which, during its fabrication, utilizes $SF_6$ or freon as the blowing or foaming agent. The particular materials employed to form the foam insulation are described in detail in copending applications (C–1484 and C–1485) Ser. Nos. 31,639 and 31,788, referred to hereinabove. The formation and fabrication of the dielectric foam insulation is carried out so that the foam 15 is comprised of approximately 95 percent closed cell construction and 5 percent open cell construction to enable a liquid coolant to percolate through the foam insulation in either liquid or vapor form in a manner to be more fully described hereinbelow. However, a larger or smaller quantity of open cells may be provided, if desired, from 2 percent up to 100 percent and preferably from 2–8 percent. A liquid dielectric with an appropriately selected boiling point is introduced into the interior region occupied by the foam insulation 15 and is added in a sufficient quantity so as to fill the aforementioned interior region until the liquid dielectric reaches the level 16 so that it covers the inner conductor 11 which is supported by the foam insulation. The volume of liquid required in a typical instance is approximately slightly less than 2.5 percent of the total interior volume since the foam insulation selected has only 5 percent open cells available to be filled. The off-center displacement of inner conductor 11 relative to conductive housing 12 further serves to reduce the total amount of liquid dielectric required. The off-center design is permissible for the reason that the liquid phase dielectric has approximately twice the dielectric strength of the vapor phase dielectric enabling the inner conductor 11 to be positioned closer to the conductive housing in the region of the bus 10 occupied by the liquid dielectric (i.e., the region below the surface 16 of the liquid). If the longitudinal axis 13 of inner conductor 11 were made colinear with the longitudinal axis 14 of conductive housing 12, the liquid level or surface 16 would have to be substantially higher. However, an increase in the amount of liquid dielectric provided would not increase the ultimate dielectric withstand.

In operation, when the bus is conducting current, a certain amount of heating ($I^2R$) will occur. When the current increases in magnitude to an undesirable level the heat generated thereby achieves a predetermined level, whereby the liquid dielectric is caused to boil and vaporize. The emitted vapors represented by dotted lines 17 will be carried away from the area of higher temperature level (the area immediately surrounding inner conductor 11) and will be carried toward a region of lower temperature level (the region immediately surrounding conductive housing 12), with the vapors being carried through the open cells provided in the dielectric foam insulation. Once cooled, the dielectric liquid will seep or percolate through the open cells and return to the pool of dielectric liquid. Recirculation will continue in this manner thereby maintaining the temperature along the entire bus run in a more uniform manner. It should further be noted, as shown in FIG. 1b, that if a "hot spot" occurs at any position along the length of the bus run that the upwardly moving vapors will move either to the left or to the right along the length of the bus run to seek a region of lower temperature level and thereby maintain the temperature substantially uniform along the length of the bus run. The above mentioned action prevents the bus from exceeding a desired operating temperature locally, subject to the cooling capabilities of the outer conductive housing 12 which will radiate heat outwardly and away from the bus. A further factor influencing the selection of the appropriate liquid dielectric resides in the fact that the pressure build-up within the isolated phase bus increases the boiling point of the liquid thereby requiring the selection of a liquid dielectric which in the presence of increased pressure will nevertheless have a characteristic boiling point which is suitable for the above mentioned cooling requirement.

Because of the cooling action of the liquid dielectric, the bus conductor can carry higher currents than those currents carried by conventional systems which depend on natural convection of the air or gas contained therein. Due to the excellent insulating qualities of the gas in both liquid and vapor form the busways employed may be of reduced dimensions.

The dielectric foam insulation which is formed of a foam insulation blown with either $SF_6$ or freon has excellent dielectric properties. However, the liquid dielectric serves to provide the cooling capability not heretofore capable of being obtained through the use of the foam insulation alone.

Suitable liquid dielectrics which may be employed and their characteristics are set forth hereinbelow:

| | | | |
|---|---|---|---|
| FREON-114 | B.P. | 23.8°C | $ccl_3F$ |
| FREON-21 | B.P. | 47.3°C | $CBrF_2 — CBrF_2$ |
| FREON-113 | B.P. | 47.6°C | $CCL_2F — CClF_2$ |
| FREON-112 | B.P. | 92.8°C | $CCl_2 — CCl_2F$ |
| FREON-214 | B.P. | 114°C | $CCl_3CF_2CF_2CL$ |
| FREON-E1 | B.P. | 39°C | n = 0* |
| FREON-E2 | B.P. | 101°C | n = 1* |
| FREON-E3 | B.P. | 152°C | n = 2* |
| FREON-E4 | B.P. | 193.5°C | n = 3* |
| FREON-E5 | B.P. | 218°C | n = 4* |

Mixtures of the above compounds can be made that will allow us any boiling point from 23.8° to 218°C.

Fluorinated hydrocarbons, such as the freons, and mixtures thereof are suitable for use as the coolant or liquid dielectric. Typical coolants include trichlorofluoromethane, trichlorotrifluoroethane, dichloramonofluoromethane, monochloroethane, monochloramonofluoroethane, difluoromonochloroethane and difluorodichloroethane, monobromodifluoromethane, monochlorodifluoromethane $CCL_3CF_2CF_2CL$

wherein n is 1–4.

Halogenated hydrocarbons, such as, for example, trichloroethylene (boiling point 87°C); 1,1,2-Trichlorethane (boiling Point 114°C), perchloroethylene (boiling point 121°C), dichloromethene and the like. Ethylene glycol (boiling point 200°C) is also useful. In general, the coolants have boiling points of about 20° to 220°C.

It can be seen from the foregoing description that the present invention provides a novel isolated phase bus system employing a dielectric foam for supporting the inner conductor relative to the outer conductor wherein a portion of the interior region defined by the inner and outer conductors is filled with a liquid dielectric of relatively low boiling point to significantly enhance the cooling capabilities of the bus system.

Although there has been described a preferred embodiment of this novel invention, many variations and modifications will now be apparent to those skilled in the art. Therefore, this invention is to be limited, not by the specific disclosure herein, but only by the appending claims.

What is claimed is

1. An isolated phase bus system comprising:
an elongated tubular inner conductor;
an elongated tubular conductive housing surrounding the inner conductor;
the annular interior region defined by said inner conductor and said conductive housing being filled with a foam having a high dielectric withstand capability;
said foam having a predetermined amount of open cells dispersed in both the radial and axial direction of the bus system;
the aforesaid interior region being partially filled with a dielectric liquid at least partially surrounding said inner conductor;
said liquid having a low boiling point whereby said liquid is caused to boil when the inner conductor heats to a predetermined temperature level causing the liquid vapors to percolate through the open cells toward a region of reduced temperature level, become condensed and seep downwardly to the pool of liquid dielectric where it may again recirculate and thereby maintain the bus at a predetermined temperature level.

2. The apparatus of claim 1 wherein said foam insulation is provided with a percentage of open cells lying within the range from 2 to 100%.

3. The apparatus of claim 1 wherein said foam insulation is provided with a percentage of open cells lying within the range from 2 to 8 percent.

4. The apparatus of claim 3 wherein the preferred range is from 4 to 6 percent.

5. The apparatus of claim 1 wherein the dielectric liquid is taken from the group of low boiling point liquids comprised of freons, ucons, chlorinated hydrocarbons, or any known dielectric liquid whose boiling point, stability, and compatability with the supporting foam is ascertained.

6. The apparatus of claim 1 wherein the dielectric liquid has a boiling point lying in the temperature range from 20° to 220°C.

7. The apparatus of claim 1 wherein the dielectric foam insulation is of open cell construction to a degree that will permit free movement of the vapors of the selected dielectric liquid.

8. The apparatus of claim 7 wherein the inner conductor is positioned below the longitudinal axis of the foam and surrounding conductive housings so as to be immersed from 1 to 100 percent in the liquid phase of said dielectric liquid.

* * * * *